Jan. 17, 1950   J. S. THIMBLETHORPE ET AL   2,494,843
ELECTRIC STOVE FOR HEATING AND COOKING
Filed March 8, 1946   6 Sheets-Sheet 1
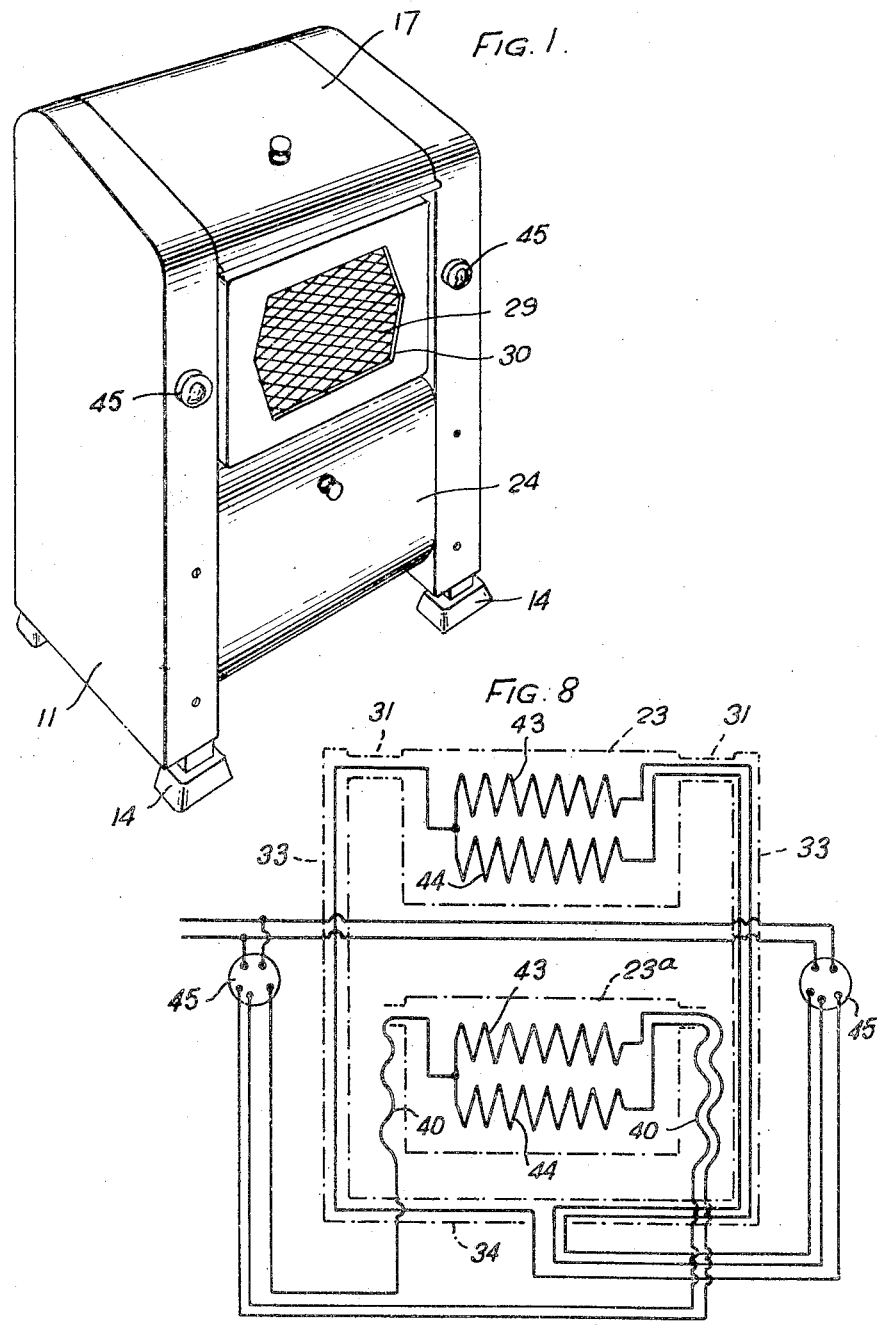
Inventors
June S. Thimblethorpe
and Wilfred S. Thimblethorpe
by Wilkinson & Mawhinney
Attorneys

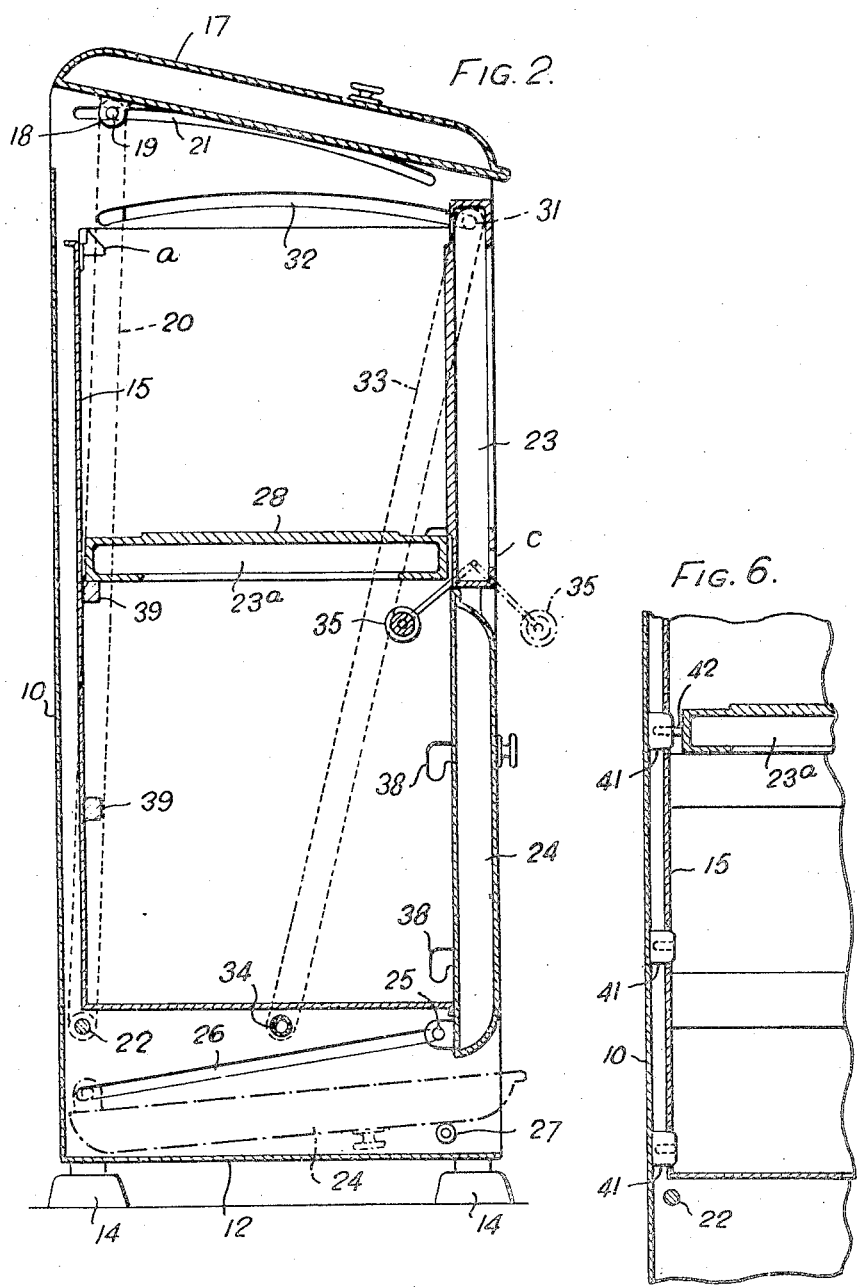

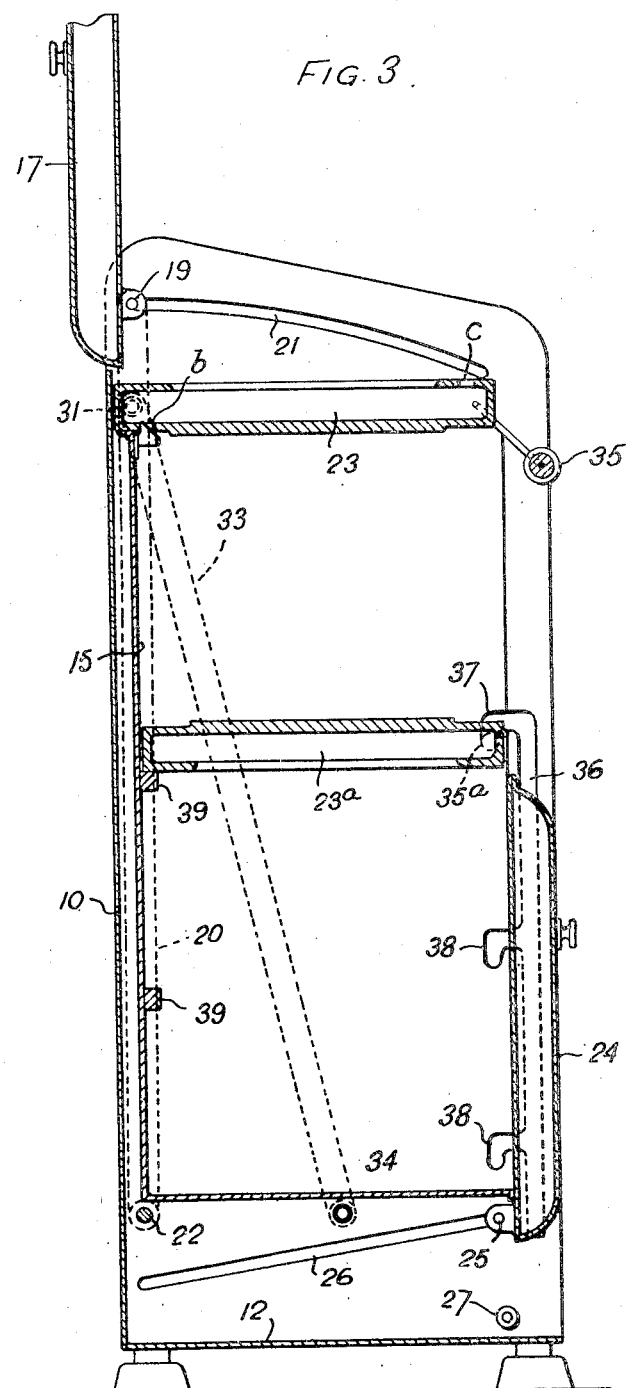

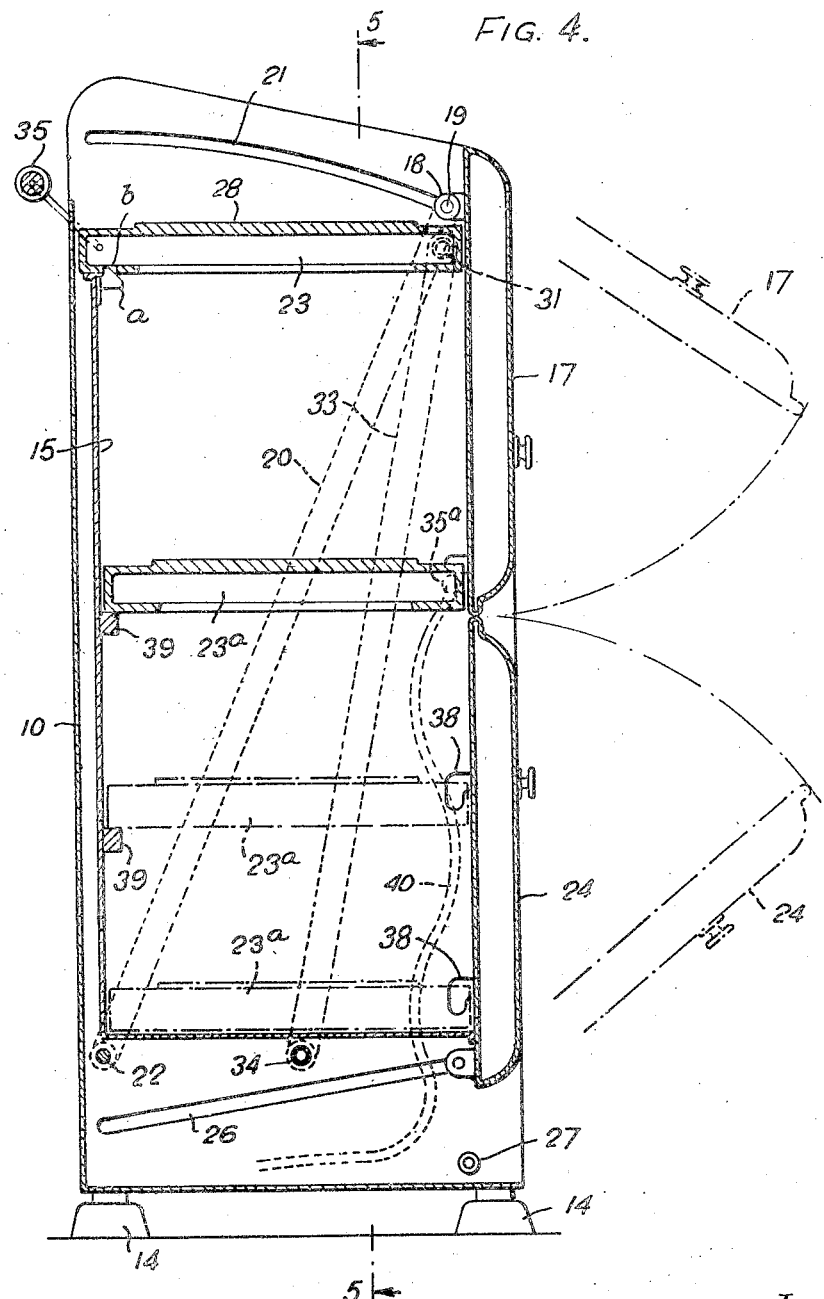

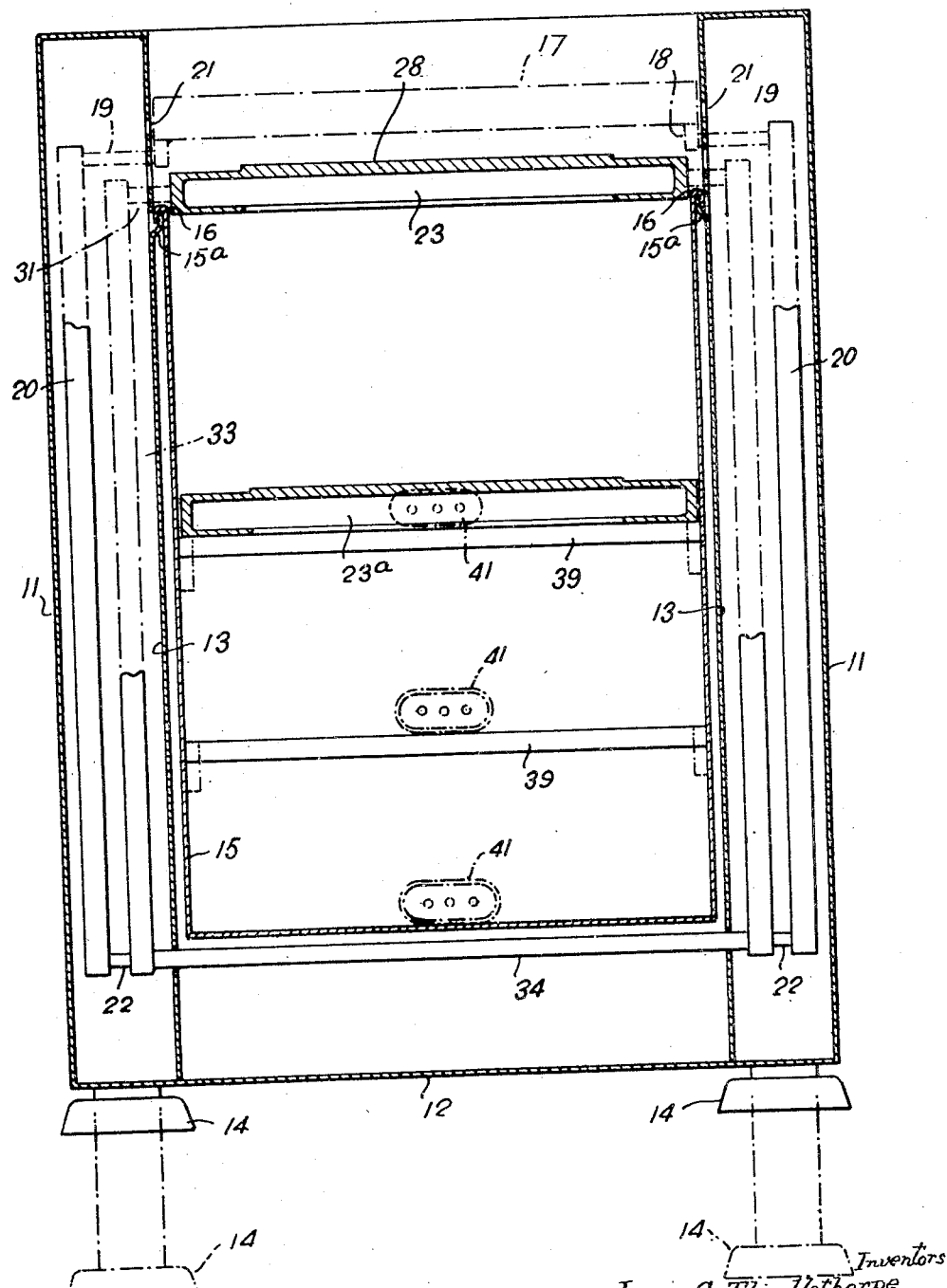

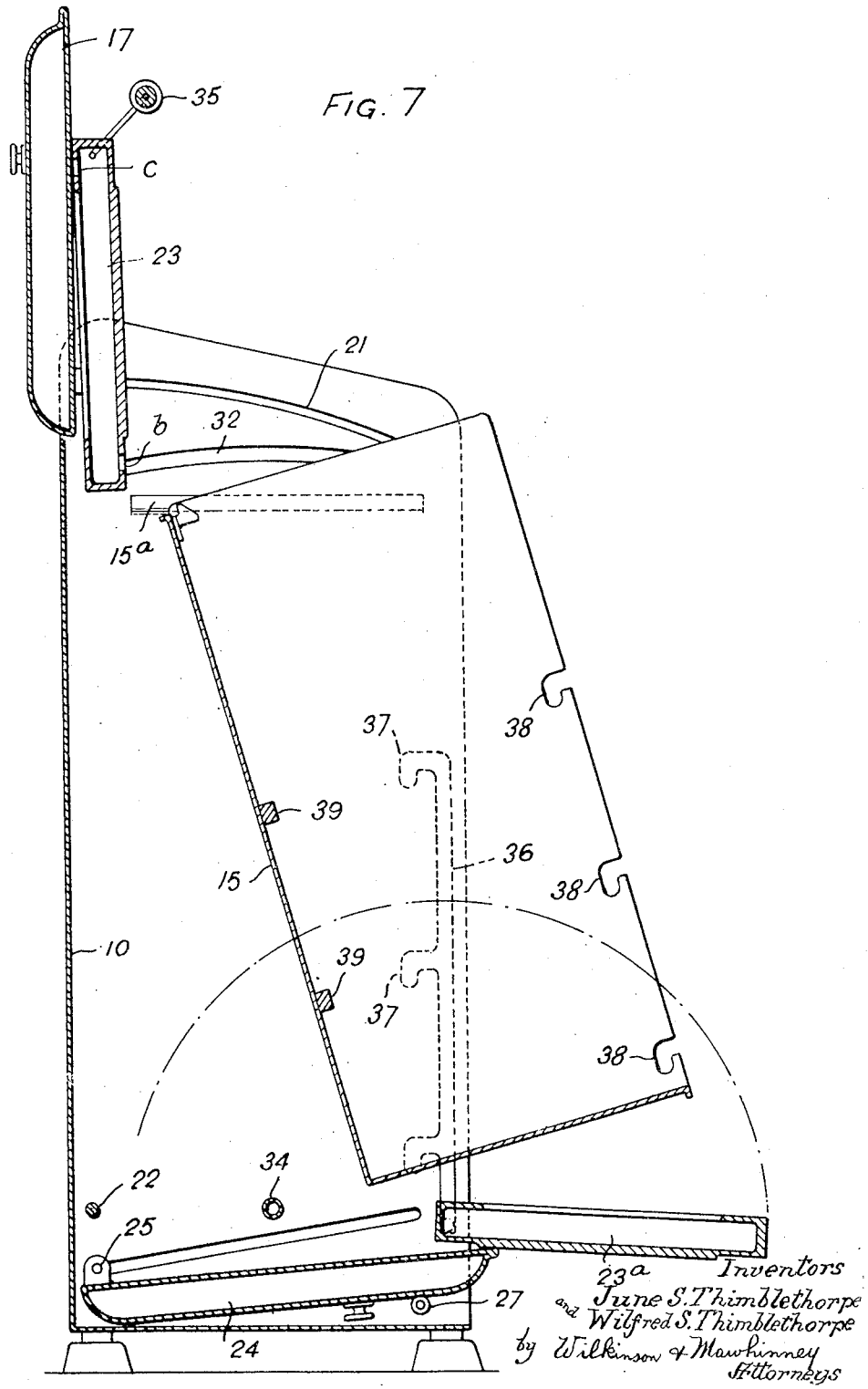

Patented Jan. 17, 1950

2,494,843

UNITED STATES PATENT OFFICE 2,494,843

ELECTRIC STOVE FOR HEATING AND COOKING

June Sylvia Thimblethorpe and Wilfred Sylvester Thimblethorpe, London, England

Application March 8, 1946, Serial No. 653,058
In Great Britain March 20, 1945

14 Claims. (Cl. 219—34)

This invention relates to electrical heating stoves of the combination type which can be used either for room warming or readily converted into hot plates, cookers or grillers.

One object of the invention is to provide a stove of this type with improved cooking arrangements including an oven.

Another object of the invention is to provide an electrical heating stove with electrical heating elements which can be moved from a room-warming position into a cooking or grilling position and into a further position wherein the unit heats an oven.

A further object of the invention is to provide an electrical heating stove having an outer casing fitted with a lid, an oven having an opening in the casing front and an electrical heating unit forming the oven door and acting as a room-warming unit so arranged that the lid can be raised to form a splash back and the electrical heating unit moved into position adjacent to the lid for frying purposes while in a further position, the heating unit can be moved to heat the oven and the lid moved into position to form the oven door.

A further object of the invention is to provide an electrical heating stove having an electrical heating unit which can be arranged in one position wherein the heating elements are exposed on the outside of the stove to heat a room or the like, in another position wherein the heating elements are exposed on the top of the stove to form a grill or fryer and in another position wherein the heating elements are exposed on the inside of the stove to heat an oven.

A still further object of the invention is to provide an electrical heating unit for use in an electrical stove of the combined room warming and cooking type comprising a metal box containing a series of heating resistance elements mounted on refractory material, the elements being exposed through an opening in the front side of the box while the back of the box is adapted to form a hot plate or a heat storage plate.

Another object of the invention is to provide an electrical heating stove of the combined type referred to with an oven adapted to be heated by a movable electrical heating unit and having a series of electrical contact points to which one or more additional electrical heating units can be connected. Another object of the invention is to provide an electrical heating stove of the combined type referred to with a lid which can be removed from its normal position covering the top of the stove casing into an upright position to form a splashback and moved into a further position in which it forms an oven door.

According to the invention the stove comprises an outer case preferably of rectangular shape and containing an oven having an opening in the front wall of the case. The top of the case is fitted with a lid. A movable electrical heating unit is provided which is so mounted that when the stove is used for room warming the unit forms the oven door by closing the oven opening in the front wall of the casing. For cooking purposes the lid of the outer case is raised and the unit is lifted and pushed back over the top of the oven so that it can be used with the heating elements exposed for frying and the like, the raised lid of the casing forming a splash back. If the oven is to be used, the unit is moved from the frying position and swung over on itself so that the heated face used for frying now heats the oven. Further the casing lid is so mounted that it can be swung over the front of the casing to form the oven door previously formed by the heating unit.

In a preferred arrangement the heating unit comprises a back plate of metal with the electrical heating elements mounted on the front thereof. With such an arrangement the heating elements are in the front when in the room-warming position and also exposed on the top in the frying position. In the oven position the back plate is on top and as this plate is continually heated by the heating elements in all the positions it forms a heat storage plate and when in position over the oven can be used as a hot or boiling plate. As it is a storage plate, when used simply as a hot plate the supply of heating medium can be reduced.

Electrical heating elements are also fixed in the bottom of the oven and come into operation when the oven is being used independently of those in the movable unit.

To enable the invention to be fully understood it will now be described by reference to the accompanying drawings, in which—

Fig. 1 is a perspective view of a stove constructed according to one form of the invention, and Fig. 2 is a sectional side elevation thereof drawn to a larger scale and showing the stove arranged as a room warming unit.

Fig. 3 is a similar view to Fig. 2 but showing the stove arranged for frying or the like, and Fig. 4 is a further view showing the stove with the oven in use.

Fig. 5 is a sectional elevation on line 5—5 of Fig. 4.

Fig. 6 is a sectional view of a detail of the oven showing an additional or alternative method of connecting the heating units.

Fig. 7 is a sectional side elevation of the stove showing a method of removing the oven.

Fig. 8 is an electrical diagram for the electrical heating units used in the stove.

As shown the stove is made of sheet metal and comprises an outer casing having a back wall 10, side walls 11, base 12 and partitions 13 parallel to the side walls 11. The base 12 is fitted with feet 14 which may be adjustable in height in any convenient manner. An oven 15 is suspended between the partitions 13 as seen best in Figs. 5 and 7.

In the preferred construction the partitions 13 are provided with slits and the metal is forced inwardly at the slits to form guides 15a, the sides of the oven having flanged or turned over edges 16 which engage the guides. This construction enables the oven to be removed for cleaning purposes as shown in Fig. 7. Obviously other forms of lugs or the like may be provided on the partitions to support the flanges or the like on the oven.

The stove is fitted with a lid 17 which is formed with side lugs 18 to which pivot pins 19 carried by a pair of links 20, one on each side of the lid, are attached. The pivot pins 19 ride in slots 21 formed in the partitions 13 and the lower ends of the links are pivotally attached to pins 22 mounted in the partitions 13 adjacent to the back wall of the casing and below the bottom of the oven. The oven front is open and in the arrangement shown the front is closed by an electrical heating unit 23 (Fig. 2) which closes the upper part and a door 24 which closes the lower part. The door 24 is carried on pivots 25 sliding in slots 26 in the lower parts of the partitions 13 below the oven bottom and can be opened and swung into the position shown in chain lines, Fig. 2, where the top of the door rests on a stop 27.

The electrical heating unit 23 is of any usual construction and comprises a metal box having a back plate 28 and containing any desired number of resistance heating elements mounted on refractory blocks for example as indicated at 29 (Fig. 1) so that the heating elements are exposed through the front opening 30 provided in the box. The heating elements are not shown in the other figures for the sake of clearness. The heating unit 23 is carried on pivot pins 31 sliding in slots 32 in the partitions 13 and attached to links 33, the lower ends of the links being carried on a spindle 34 mounted in the lower part of the partitions 13 below the bottom of the oven as clearly shown in Fig. 5. The spindle 34 is arranged in front of the pivots 22 of the lid links 20 so that in operation the links 20 pass over the links 33 without interference.

With a stove constructed as above described the operation is as follows:

For room warming the parts are in the position shown in Fig. 2, the lid 17 and the lower oven door 24 are closed and the heating unit 23 closes the upper part of the oven front with the heating elements exposed to the room. A handle 35 is attached to one end of the heating unit and if it is desired to cook by frying, for example, the lid 17 is raised and pushed back so that it is in a vertical position and acts as a splash back and the door 24 is opened to give access to the handle 35. The heating unit 23 is swung outwardly and pushed back over the top of the oven into the position shown in Fig. 3 so that the heating elements are exposed and can be used for frying or the like. In this position a lug *a* on the top of the oven 15 engages a slot *b* provided in the back plate 28 of the heating unit.

If it is desired to use the oven the heating unit 23 is moved from the frying position and swung over on itself into the position shown in Fig. 4 wherein the heating elements are now exposed to the oven, the lug *a* engaging the slot *c* provided on the front face of the unit. Further the lid 17 is swung over the front of the stove into position to close the upper part of the oven opening previously closed by the unit 23. As shown in Figs. 2 to 5 the oven is provided with an independent heating unit 23a similar to the unit 23 and this can be arranged in various positions in the oven. The front end of the unit 23a is fitted with trunnions 35a which engage in slots 36 formed in the partitions 13 the slots having offset portions 37 and the sides of the oven having corresponding slots 38. The unit rests with its front end supported in the offset slots and its rear end resting on a bar or lugs 39 provided on the back of the oven 15.

With this arrangement as shown in Fig. 4 the unit 23a can be lifted and moved into one of three positions, the upper position shown in full lines, a middle position and a bottom position as indicated in chain lines. If desired the door 24 can be opened and pushed under the oven bottom as indicated in Fig. 2 and the heating unit 23a can be raised or swung into the door opening, into the room warming position. Electric power may be supplied to the unit 23a by the leads 40. Alternatively as shown in Fig. 6 electrical contact sockets 41 are attached to the back 10 and project into the oven and the unit 23a is fitted with a contact plug 42 so that it can be connected with the appropriate socket. It will be understood that the sockets are connected to the stove wiring circuit and that any suitable type of switch is used to control the units. The links carrying the upper unit 23 may be tubular and the spindle 34 may also be hollow and serve to contain the electric leads for supplying the unit. They may, however, be of any suitable construction.

It will be understood that the heating units may be connected electrically in any usual manner and that the stove is fitted with the usual plug connection for a power circuit.

Fig. 8 shows a wiring diagram for one suitable arrangement of the heating units 23, 23a. Each unit comprises two sets of elements 43, 44 connected to switches 45 the circuit arrangement being such that the units can be separately operated and also each set of elements 43, 44 can be independently operated or connected in parallel or series as is usual in electric heaters of this type.

In certain cases it may be desired to fit the stove into an existing fitment designed to present a flush surface to the room. In this case the stove may be modified by omitting the swinging lid and providing the stove casing with a sliding member which closes the casing above the heating unit in the room-warming position and which can be removed or pushed into position above the casing to expose the grilling or frying space on the top of the oven. The said member may also be moved into position to act as the oven door when the oven is used.

Further, the stove casing may be made in two parts, including the oven, slidably connected in such a manner that the front of the stove may be drawn out into the room to increase the internal dimensions when used for cooking and pushed back again into the flush front position when used for room warming.

If desired the links 20 carrying the lid 17 and the links 33 carrying the heating unit 23 may be connected to a suitable operating lever which may be operated by the foot or hand to move the parts into the desired positions without using the handle 35 on the heating unit.

It will be understood that the oven may be fitted with removable shelves of any suitable type and further that the electrical heating units may have heating elements exposed on both sides, the back or cover plate being omitted.

We claim:

1. A heating stove comprising walls defining an oven casing open at the top, said walls including a front wall having an opening, a closure member adapted when moved to one position to close the front wall opening and when moved to another position to close the oven top, means for supporting said closure member in either of the said positions, said closure member supporting means comprising at least one link pivotally connected at its upper end to the closure member and at its lower end to a fixed support whereby the upper end of the link may be swung from the front to the rear of the oven, an electrical heating unit having a resistance heating element, means for pivotally suspending said unit whereby said unit closes the said front wall opening with the resistance element exposed to the space outside the oven, said pivotal suspending means being displaceable from the front of the oven to the rear thereof and arranged to permit the unit to be swung into a position whereby the unit extends across the top of the oven with the resistance elements exposed to the interior of the oven and means for releasably holding the said unit in position across the top of the oven.

2. A heating stove comprising walls defining an oven casing, said walls including a front wall having an opening, a closure member adapted when moved to one position to close the front wall opening and when moved to another position to be displaced from said front wall opening, means for supporting said closure member in either of the said positions, an electrical heating unit having a resistance heating element, means for pivotally suspending said unit whereby said unit closes the said front wall opening with the resistance element exposed to the space outside the oven, said unit suspending means comprising at least one link pivotally connected at its upper end to the heating unit and at its lower end to a fixed support whereby said link may be swung from the front to the rear of the oven and said heating unit may be moved into a position across the oven top with the resistance element exposed to the space above the oven and means for releasably holding the said unit in position across the top of the oven.

3. A heating stove comprising walls defining an oven casing open at the top, said walls including a front wall having an opening, a closure member adapted when moved to one position to close the front wall opening and when moved to another position to close the oven top, means for supporting said closure member in either of the said positions, said closure member supporting means comprising at least one link pivotally connected at its upper end to the closure member and at its lower end to a fixed support whereby the upper end of the link may be swung from the front to the rear of the oven, an electrical heating unit having a resistance heating element, means for pivotally suspending said unit whereby said unit closes the said front wall opening with the resistance element exposed to the space outside the oven, said unit suspending means comprising at least one link pivotally connected at its upper end to the heating unit and at its lower end to a fixed support whereby the upper end of said last mentioned link may be swung from the front to the rear of the oven and said heating unit may be moved into a position across the oven top and means for releasably holding the said unit in position across the top of the oven.

4. A heating stove as claimed in claim 1 comprising an inner body formed by a base, a back and side walls, partitions between the side walls of the inner body and the side walls of the casing and inwardly directed projections on the partitions adapted slidably to support the inner body, the arrangement being such that the inner body is removable through the opening in the front wall of the casing, the partitions being provided with guide slots for the means pivotally supporting the heating unit.

5. A heating stove as claimed in claim 1 comprising an inner body formed by a base, a back and side walls, partitions between the side walls of the inner body and the side walls of the casing and inwardly directed projections on the partitions adapted slidably to support the inner body, the arrangement being such that the inner body is removable through the opening in the front wall of the casing, the partitions being provided with guide slots for the means pivotally supporting the heating unit.

6. A heating stove as claimed in claim 1 comprising an inner body formed by a base, a back and side walls, partitions between the side walls of the inner body and the side walls of the casing and inwardly directed projections on the partitions adapted slidably to support the inner body, the arrangement being such that the inner body is removable through the opening in the front wall of the casing, the partitions being provided with guide slots for the means pivotally supporting the heating unit.

7. A heating stove as claimed in claim 1 comprising an inner body formed by a base, a back and side walls, partitions between the side walls of the inner body and the side walls of the casing and inwardly directed projections on the partitions adapted slidably to support the inner body, the arrangement being such that the inner body is removable through the opening in the front wall of the casing, the partitions being provided with guide slots for the pivotal supporting means for the closure member and for the pivotal supporting means for the heating unit.

8. A heating stove as claimed in claim 2 comprising an inner body formed by a base, a back and side walls, partitions between the side walls of the inner body and the side walls of the casing and inwardly directed projections on the partitions adapted slidably to support the inner body, the arrangements being such that the inner body is removable through the opening in the front wall of the casing, the partitions being provided with guide slots for the means pivotally supporting the heating unit.

9. A heating stove as claimed in claim 3 comprising an inner body formed by a base, a back and side walls, partitions between the side walls of the inner body and the side walls of the casing and inwardly directed projections on the partitions adapted slidably to support the inner body, the arrangement being such that the inner body is removable through the opening in the front wall of the casing, the partitions being provided with guide slots for the means pivotally supporting the heating unit.

10. A heating stove as claimed in claim 1 comprising a casing having a front wall provided with two superimposed openings, a door for closing the lower of said openings, and supporting means in the oven behind said lower opening for releasably holding an electrical heating unit whereby said unit may be supported at different levels in the oven.

11. A heating stove as claimed in claim 3 comprising a casing having a front wall provided with two superimposed openings, a door for closing the lower of said openings, and supporting means in the oven behind said lower opening for releasably holding an electrical heating unit whereby said unit may be supported at different levels in the oven.

12. A heating stove as claimed in claim 1 comprising a casing having a front wall provided with two superimposed openings, a door for closing the lower of said openings, supporting means in the oven behind said lower opening for releasably holding an electrical heating unit whereby said unit may be supported at different levels in the oven, and plug and socket contact means on the back of the oven and on the heating unit.

13. A heating stove as claimed in claim 3 comprising a casing having a front wall provided with two superimposed openings, a door for closing the lower of said openings, supporting means in the oven behind said lower opening for releasably holding an electrical heating unit whereby said unit may be supported at different levels in the oven, and plug and socket contact means on the back of the oven and on the heating unit.

14. A heating stove as claimed in claim 1 comprising a casing having two superimposed openings and side walls provided with guide slots, a door for closing the lower of said openings and pins on the door for slidably engaging in the guide slots whereby the door may be caused to lie flat in the bottom of the casing.

JUNE SYLVIA THIMBLETHORPE.
WILFRED SYLVESTER THIMBLETHORPE.

REFERENCES CITED

The following references are of record in the file of this patent:

UNITED STATES PATENTS

| Number | Name | Date |
|---|---|---|
| 1,885,041 | Baker | Oct. 25, 1932 |
| 1,959,193 | Conry | May 15, 1934 |
| 2,247,974 | Thimblethorpe | July 1, 1941 |
| 2,257,580 | Trompeter | Sept. 30, 1941 |
| 2,313,968 | Reich | Mar. 16, 1943 |
| 2,422,950 | Cash | June 24, 1947 |